United States Patent [19]
Merrill

[11] 3,784,449
[45] Jan. 8, 1974

[54] APPARATUS AND METHOD FOR GENERATING ELECTRICITY

[76] Inventor: George E. Merrill, 266 Sposito Cir., San Jose, Calif. 95136

[22] Filed: Mar. 15, 1971

[21] Appl. No.: 124,002

[52] U.S. Cl.............. 202/180, 202/182, 202/234, 203/10, 203/100
[51] Int. Cl............................................ B01d 3/00
[58] Field of Search................. 203/100, DIG. 16, 203/DIG. 20, 10, 11; 202/234, 182; 60/55 T, 64

[56] References Cited
UNITED STATES PATENTS

| | | | |
|---|---|---|---|
| 3,140,986 | 7/1964 | Hubbard | 203/100 |
| 3,468,762 | 9/1969 | Klitzsch | 60/64 |
| 3,352,107 | 11/1967 | Blaskowski | 203/100 |
| 2,515,013 | 7/1950 | Kruhmin | 203/100 |
| 3,470,943 | 10/1969 | Van Husen | 203/100 |

OTHER PUBLICATIONS

Science & Mechanics, October 1951, pg. 95 & 96

Primary Examiner—Wilbur L. Bascomb, Jr.
Attorney—Allen & Chromy

[57] ABSTRACT

A turbine driven high frequency generator located in a chamber at the bottom of a deep hole in the earth or on the ocean floor thereby providing a natural head with respect to the turbine that is great enough to drive the generator which has a generating capacity sufficient to vaporize a substantial part of the water supplied to furnaces from the turbine. The steam produced in the furnaces is piped upward to a condenser, located at or near the surface, in which it is condensed into potable water and the water supplied to the turbine passes through the condenser to be preheated before dropping through said head to the turbine.

3 Claims, 4 Drawing Figures

INVENTOR.
GEORGE E. MERRILL
BY
ATTORNEYS

INVENTOR.
GEORGE E. MERRILL

3,784,449

APPARATUS AND METHOD FOR GENERATING ELECTRICITY

DESCRIPTION OF THE INVENTION

This invention relates to a method and apparatus for generating electricity and distilling ocean or brackish water.

An object of this invention is to provide an apparatus which is located at the bottom of a deep hole in the earth or on the ocean floor, for heating water by utilizing electrical energy generated by said water falling a predetermined distance to said apparatus in said hole, the steam produced from said water being piped to the surface and condensed into potable water.

Another object of this invention is to provide a turbine driven high frequency generator supplying power to a furnace for heating water having a high salt content, such as, ocean water, said turbine, generator and furnace being positioned at the bottom of a long vertical pipe or casing which is provided with a channel for feeding the ocean water to said turbine.

Still another object of this invention is to provide a turbine driven high frequency generator feeding furnaces with high frequency alternating current, said furnaces receiving ocean water or brackish water used to drive said turbine, said water having a natural head with respect to said turbine that is great enough to drive said generator the normal generating capacity of which is sufficient to vaporize substantially all of the water supplied said furnaces from said turbine.

Other and further objects of this invention will be apparent to those skilled in the art to which it relates from the following specification, claims and drawing in which, briefly:

Figure 1:
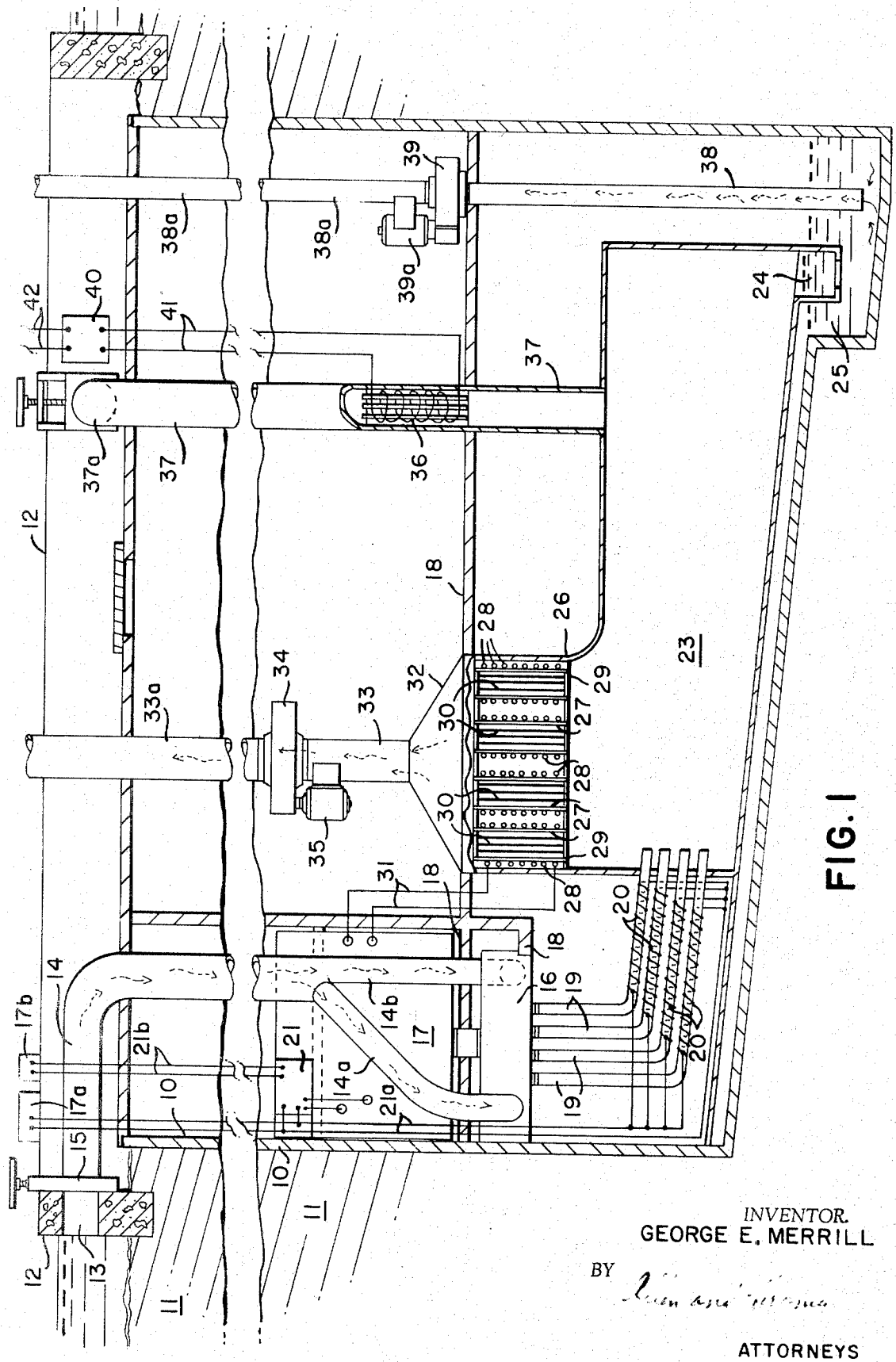
FIG. 1 is a vertical sectional view partially broken away showing an embodiment of this invention located in a deep well provided in the earth in close proximity to a supply of ocean or brackish water.
Figure 2:
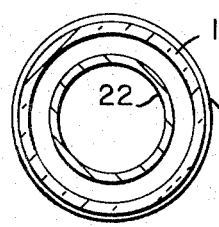
FIG. 2 is a sectional view of one of the furnace tubes connected to the turbine of this apparatus.
Figure 4:
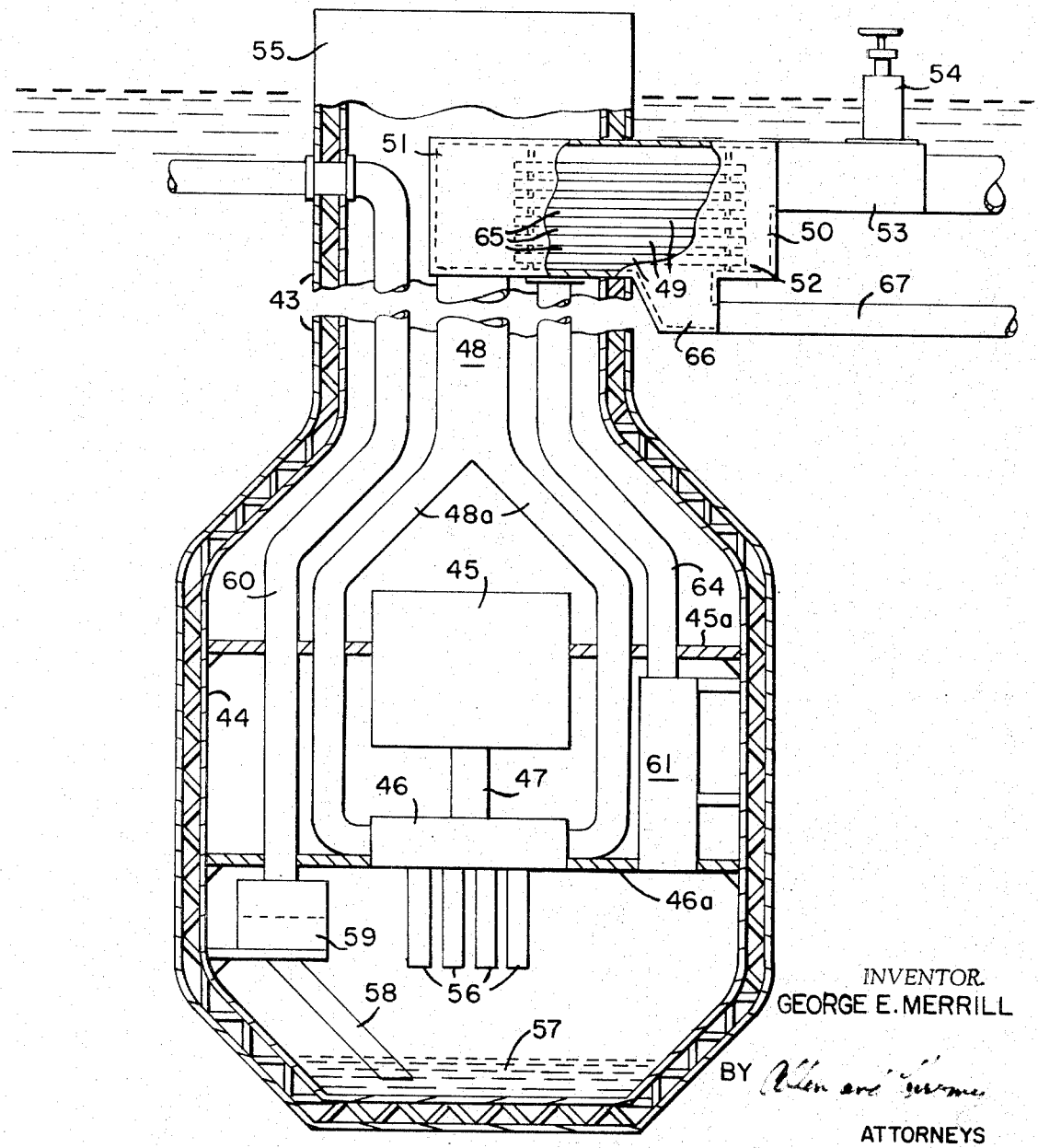
FIG. 4 is a vertical view partially in section and partially broken away showing an embodiment of this apparatus positioned in a long pipe or chamber that is adapted to be erected in the ocean.

Referring to the drawing in detail, reference numeral 10 designates a substantially circular wall structure which may be of metal, plastic or the like, impervious to water and which is either a casing lining a hole formed in the ground 11 as shown in FIG. 1, or it may be a casing lowered into a water body such as the ocean shown in FIG. 4. In either instance this casing is several hundred feet long. The wall structure 10 shown in FIG. 1 forms a lining for a hole excavated in the ground 11 under relatively shallow water near the ocean shore and it is surrounded by the wall 12 which is also impervious to water and which is provided with a hole 13 to which the water inlet pipe 14 is connected. The pipe 14 is provided with a gate valve 15 so that the flow of water through the hole 13 to the pipe 14 may be controlled.

The vertical length of the pipe 14 is at least 500 feet and the lower part thereof is divided into two branches 14a and 14b which are connected to the water turbine 16 which is driven by water supplied thereto under pressure of the 500 foot water head. Water turbine 16 is fixedly attached to the shaft of the high frequency generator or alternator 17 which may be of the Alexanderson type capable of generating electric current having a frequency on the order of 10,000 to 30,000 Hertz. Thus, both the turbine 16 and generator 17 are of conventional construction except that the turbine is made of stainless steel to resist corrosion by ocean water and salts carried by the water. The turbine and generator are supported by the structural members 18 attached to the wall 10 by welding or the like.

Several ceramic pipes 19 are connected to the housing of the turbine 16 to conduct the water which drives the turbine out of the housing thereof and these ceramic pipes are provided with high frequency coils 20 of stainless steel wire. These coils are wound either on the exteriors of the pipes 19 or they may be embedded in the ceramic of the pipes and they are connected by the conductors 21 to the output of the generator 17. Tubular members 22 of stainless steel are positioned inside of the ceramic pipes 19 and these tubular members are spaced from the inner walls of the pipes in which they are positioned so that water can flow both on the inside and outside of these tubular members.

The stainless steel tubular members 22 are heated by the high frequency current supplied to the coils 20. The high frequency current flowing in the coils 20 sets up magnetic fields in the pipes 19 which induce electromotive forces into the tubular members 22 and the high frequency current circulating in these tubular members cause heating thereof. Thus, the water leaving the turbine 16 through pipes 19 is heated in the coil sections of these pipes which are surrounded by the coils 20. The water passing through the pipes 19 is thus brought up to boiling temperature. Some of the water is vaporized and some of it leaves the open ends of these pipes as a concentrated brine solution which flows into the inclined vat 23 in which the salts carried thereby are concentrated.

Figure 3:
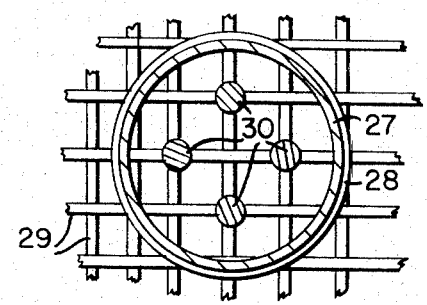
FIG. 3 is a sectional view of one of the tubes of the steam superheating furnace provided to this apparatus.

The concentrated salt solution flows toward the sump 24 which opens into the larger sump 25 and this concentrated solution is pumped out of the sump 25 through pipe 38 which is connected to pump 39. The water vapor rises into the coil housing 26 which is provided with an array of ceramic tubes 27, each of which is surrounded by a high frequency coil 28. The tubes 27 are also of ceramic and the coils 28 are of stainless steel wire. The coil housing 26 is also supported by the structural members 18 and the ceramic pipes 27 are supported in this housing 26 by the baffle member 29. Each of the pipes 27 is provided with a plurality of stainless steel rods 30 which are supported therein as shown in FIG. 3. These rods are spaced apart so that water may flow therebetween.

The coils 28 are also connected in parallel and these coils are energized by high frequency current produced by the generator 17 to which these coils are connected by conductors 31. When the coils 28 are energized by high frequency electric currents the rods 30 in the pipes 27 are brought to a high temperature and the water vapor through these pipes is heated sufficiently to produce steam. The steam flows upward through the hood 32 and pipe 33. The hood 32 is attached to the top of the chamber 26 and the pipe 33 is attached to the top of the hood. Suitable insulation may be provided to the outside of the hood 32 and pipe 33 to prevent loss of heat so that the steam which may be superheated will not lose too much of its energy in passing upward through this pipe to the outside of the casing 10 as shown in FIG. 4, where it is condensed into potable water while preheating water entering the feed pipe. The flow of the steam through the pipe 33 may be accelerated by providing a blower 34 which is driven by the motor 35 as shown in FIG. 1.

This apparatus may also be provided with an auxiliary furnace 36 which is positioned in the pipe 37 and which is adapted to receive some of the water vapor from the chamber 23 to produce superheated steam. The high frequency winding of the furnace 36 is similar to that of the furnace located in the chamber 26 and is connected by the conductors 31 to a generator 40 of high frequency current. The high frequency current generator 40 may be of conventional construction and is driven by an electric motor which is supplied over the line 42.

The concentrated salt solution flows down the inclined floor of the chamber 23 to the sump 24 which has an open bottom through which it is connected to the larger sump 25. The concentrated salt solution is pumped out of the sump 25 through the pipe 38 by the pump 39 which is driven by the electric motor 39a. Several pumps such as pump 39 are used to pump the concentrated salt solution to the surface through the pipe 38a so that the various chemicals in the concentrated solution may be recovered and utilized.

In FIG. 4 there is shown an embodiment of this invention that is adapted to be positioned in ocean water having a depth of over 500 feet. This embodiment of this invention is provided with a reinforced pipe 43 which has a double wall thickness and the spacing between the walls is provided with suitable bracing members attached thereto. While the pipe 43 is shown as made of continuous inner and outer members, these members may be fabricated from sheets of stainless steel or other corrosion resisting metal riveted or otherwise joined together to form the inner and outer pipe members.

The bottom part of the pipe is enlarged to provide space for the high frequency generator 45 the rotor of which is attached to the shaft 47 that is driven by the turbine 46. The generator 45 and turbine 46 are of conventional construction as previously described in the description of the generator 17 and turbine 16 shown in FIG. 1, and these units are supported by the members 45a and 46a, respectively. Ocean water is fed to the turbine 46 through the pipe 48, the lower part thereof being divided into the two branches 48a which are connected to the housing of the turbine 46. Ocean water is fed into the upper part of the pipe 48 through the tubes 49 of the condenser 50. For this purpose the left hand part of the condenser 50 is provided with a cavity 51 which is connected to the pipe 48 and the left hand ends of the tubes 49 open into this cavity. The right hand portion of the condenser 50 is provided with a cavity 52 and the right hand ends of the tubes 49 open into this cavity. Ocean water is supplied into cavity 52 through the pipe 53 and a gate valve 54 is positioned in this pipe so that the pipe may be either opened or closed to control the flow of ocean water as desired. The upper part of the pipe 43 is provided with a cap 55 for closing the pipe and this cap may extend above the surface of the ocean to support suitable warning or signaling devices (not shown) so that ocean going vessels do not collide with the structure.

The bottom of the turbine housing is provided with a plurality of exhaust pipes 56 which are similar to the pipes 19 shown in FIG. 1 and which are provided with coils similar to the coils 20 shown in FIG. 1 that are connected to the generator 45 so that high frequency current is supplied to these coils. The circuit arrangement of this portion of the invention shown in FIG. 4 is the same as that shown in FIG. 1 and an auxiliary supply of high frequency current is also provided so that the stainless steel tubes or other metallic members inside of the pipes 56 may be heated by the auxiliary source of high frequency when the apparatus is first placed into operation. The auxiliary generator of the high frequency may be positioned in the upper structure 55 and this auxiliary high frequency generator may be driven by a suitable motor or engine such as an internal combustion engine.

After the members inside of the pipes 56 are brought up to the desired high temperature the gate valve 54 is opened so that ocean water flows through pipe 53 and condensor 50 into the vertical pipe 48 and through the branches 48a to the turbine 46. The turbine 46 then drives the generator 45 and the generator is then connected to the coils on pipes 56 after the auxiliary high frequency generator is disconnected therefrom. Some of the water passing through the pipes 56 is vaporized and separated from the salts occurring in the ocean water. The concentrated salt solution goes to the pool 57 in the bottom of the structure and is pumped out through the pipe 58 by the pump 59 which lifts the brine into pipe 60. Additional pumps (not shown) may be provided in the pipe 60 at spaced positions to facilitate lifting the brine to the surface.

The water vapor coming out of the pipes 56 is admitted into a chamber 61 which is similar to the chamber 26 as shown in FIG. 1 and this chamber is also provided with high frequency coils which heat members supported therein. The water vapor entering chamber 61 is heated to superheated steam and passes upward through the pipe 64 into the cavity 65 of the condenser 50. Cavity 65 is provided with a sump 66 in which the condensed potable water is collected and from which it is pumped through the pipe 67 that leads to a suitable reservoir (not shown). The pipe 64 may be provided with a suitable motor driven pump such as the pump 34 shown in FIG. 1 to move the superheated steam out of the chamber 61.

Suitable elevators such as are used in mine shafts may be provided to this apparatus to lower service personnel and equipment into the lower part of this apparatus and suitable doors or removable panels may be provided in the walls of the generator, turbine and furnace compartments for access thereto. This structure is conventional and is not shown in the drawing.

While I have shown and described a preferred form of the invention, it will be understood that the invention is capable of variation and modification from the form shown so that the scope thereof should be limited only by the proper scope of the claims appended hereto.

What I claim is:

1. In apparatus for generating electricity and distilling ocean or brackish water, the combination of a casing, a vertical channel member positioned in said casing, said casing and said channel member having lengths substantially over five hundred feet with means feeding said ocean or brackish water into the upper end of said vertical channel member, a turbine having a housing connected to the lower end of said vertical channel member, a generator generating high frequency electric current, means coupling said generator to said turbine, high frequency furnace means comprising a plurality of ceramic pipes having the inlets thereof connected to said turbine housing, said furnace means having electrically conductive windings embedded in said ceramic pipes, means connecting said windings to said generator, said furnace means having metal elements in said ceramic pipes that are heated by high frequency currents induced therein by the high frequency currents flowing in said windings, said metal elements being bathed in the water exhausted from said turbine so that said water is heated and partially vaporized, said casing having means supporting said turbine, said generator and said furnace means, said casing having a sump at the bottom thereof receiving the unvaporized water and salts dissolved therein from said furnace means, said furnace means having means heating the vaporized component of said water to superheated steam, said water feeding means including a steam condenser, means feeding said superheated steam to said condenser and means storing the water condensed in said condenser.

2. In apparatus for generating electricity and distilling ocean or brackish water, the combination as set forth in claim 1, further comprising an auxiliary source of current supply, means connecting said auxiliary source to said furnace means to heat said furnace means to a predetermined temperature and means connecting said furnace means to said generator after said furnace means is heated to said predetermined temperature.

3. In apparatus for generating electricity and distilling ocean or brackish water, the combination as set forth in claim 1, further characterized in that said furnace means comprises heating means receiving water directly from said turbine for vaporizing part of the water received thereby and allowing the concentrated salt solution to flow to said sump, and means drawing said vaporized component of said water through said furnace means for heating said component to said superheated steam.

* * * * *